Aug. 1, 1961 E. HOPNER ET AL 2,994,736

KEYBOARD ACCESS CONTROL SYSTEM

Filed Dec. 23, 1957 2 Sheets-Sheet 1

INVENTORS
EMIL HOPNER
FREDERICK B. WOOD
WALTER J. JOHNSON Jr.

BY Richard E. Cummins

ATTORNEY

Aug. 1, 1961 E. HOPNER ET AL 2,994,736

KEYBOARD ACCESS CONTROL SYSTEM

Filed Dec. 23, 1957 2 Sheets-Sheet 2

United States Patent Office 2,994,736 Patented Aug. 1, 1961

2,994,736

KEYBOARD ACCESS CONTROL SYSTEM

Emil Hopner, Frederick B. Wood, and Walter J. Johnson, San Jose, Calif., assignors to International Business Machines Corporation, New York, N.Y., a corporation of New York Filed Dec. 23, 1957, Ser. No. 704,632
4 Claims. (Cl. 178—2)

This invention relates in general to time division multiplexing communication systems employing a number of keyboards for supplying intelligence to the communication channels, and in particular to a keyboard access control system for limiting the number of keyboards accessible to the multiplexing system at any given time.

In time division multiplexing communication systems the number of keyboards provided is usually in excess of the number of communication channels available, and hence a suitable arrangement must be provided for controlling the access of each keyboard to the system. The present invention provides a relatively simple and inexpensive solution to the problem and comprises a control circuit including a plurality of resistive units, each of which is associated with a different keyboard and variable from one position to another in response to actuation of a request key positioned on the associated keyboard. The resistive units are connected in parallel to a source of voltage through a control unit so that actuation of a predetermined number of these resistive units by their associated request keys causes operation of the control unit which causes a control signal to be supplied to each keyboard. A locking mechanism provided at each keyboard is operable in response to the control signal for preventing each of the remaining keyboards from obtaining access to the system.

It is therefore an object of the present invention to provide an improved keyboard access control system for a communication system employing a number of keyboards in excess of the number of available transmitting channels.

Another object of the present invention is to provide an improved keyboard access control system in which a control signal is generated in response to actuation of a predetermined number of keyboards.

A further object of the present invention is to provide a multiplexing communication system with a keyboard access control system employing a number of variable resistors, each of which is associated with a different keyboard and actuable from one position to another by a request key which guarantees access to the communication system, and means responsive to actuation of a predetermined number of request keys for rendering the actuation of the remaining request keys ineffective.

Other objects of the invention will be pointed out in the following description and claims and illustrated in the accompanying drawings, which disclose, by way of example, the principle of the invention and the best mode which has been contemplated of applying that principle.

Figure 2:
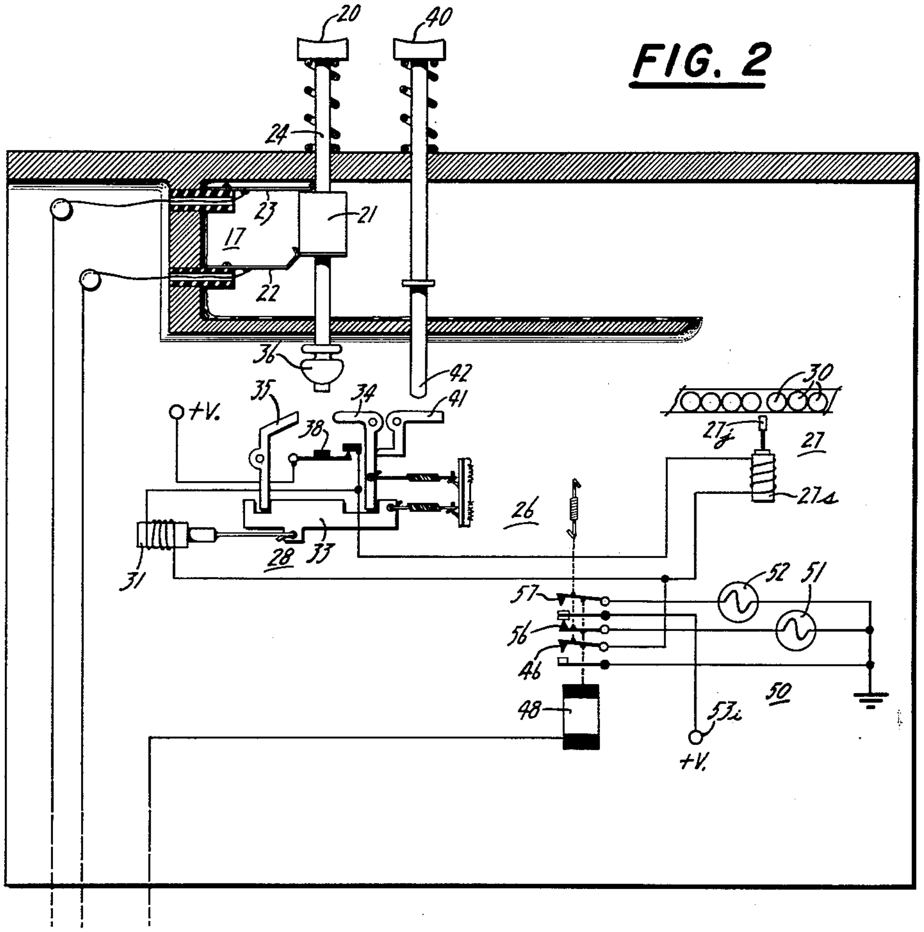
FIG. 2 is a schematic view of a portion of one of the keyboards shown in FIG. 1.
Figure 3A:
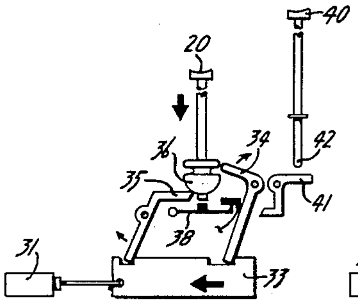
Figure 3B:
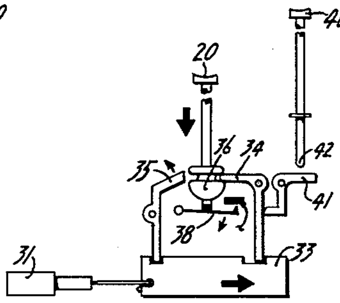
Figure 3C:
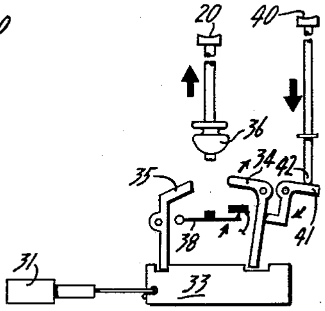

FIGS. 3*a* through 3*c* are views illustrating the operation of the request key and locking arrangement shown in FIG. 2.

Figure 1:
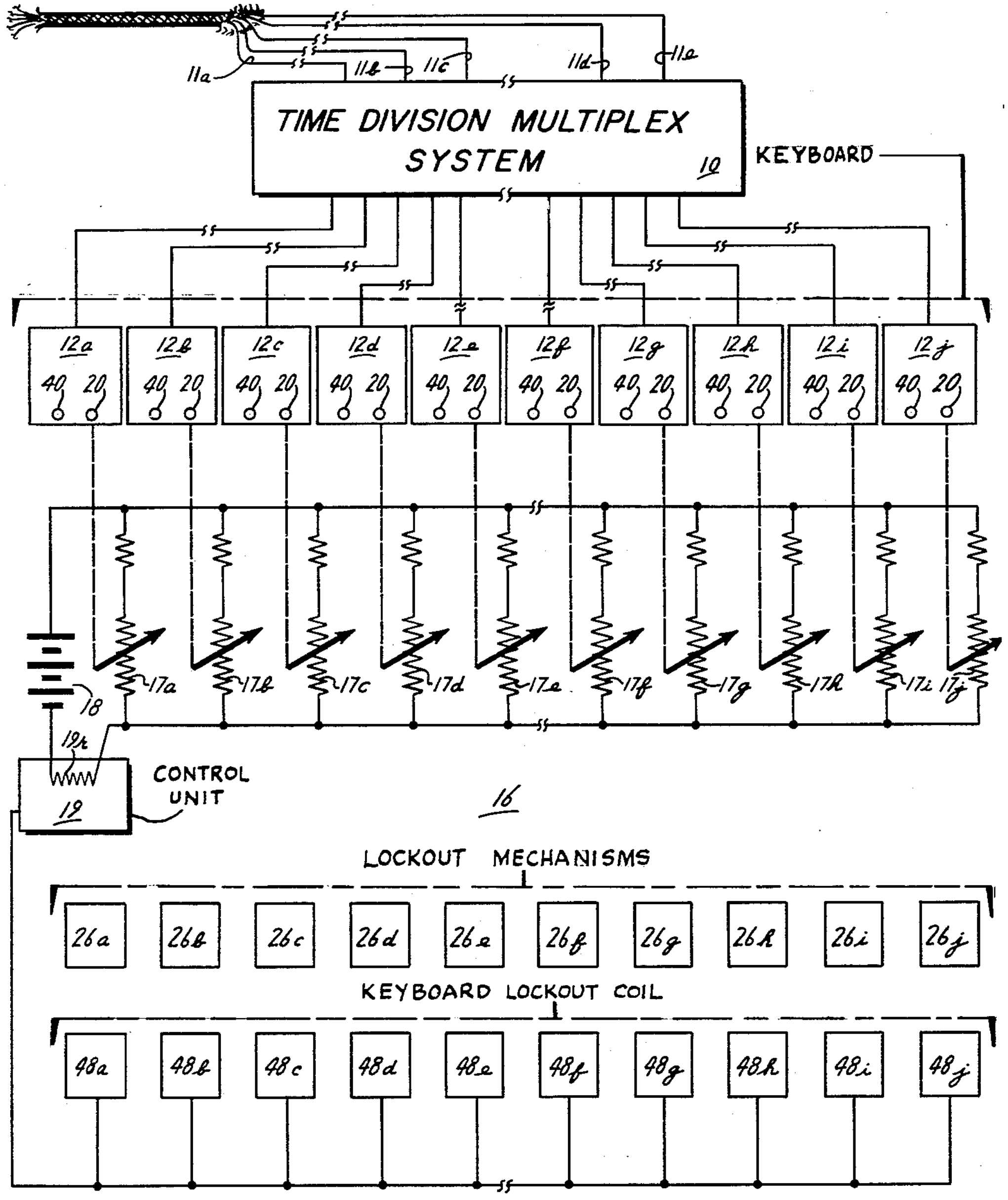
FIG. 1 is a diagrammatic view of a multi-channel communication system embodying the access control system of the present invention.

Referring to the drawings and particularly to FIG. 1, the system illustrated therein comprises a time division multiplexing communication system designated generally by reference character 10 and represented in block form. The communication system is shown for purposes of explanation as having five communication channels **11*a* through 11*e* and ten input keyboards 12*a* through 12*j*, each of which is operable to send information through the communication system. In practice, the communication system 10 would employ a much larger number of channels 11 and a proportionately larger number of keyboards 12**.

The communication system is provided with a control system 16 for limiting the number of keyboards 12 that may have access to the channels **11*a* through 11*e* at any particular time. The control system 16 comprises a plurality of variable resistive units 17*a* through 17*j* which are connected in parallel across a source of constant voltage (or current), shown as a battery 18, through a control unit 19. Each of the resistive units 17*a* through 17*j* is associated with a different keyboard 12 and is movable from one position to another in response to actuation of a request key 20 positioned on the associated keyboard 12. Line drop compensating resistors may be connected in series with each of the resistive units 17** to balance the resistance of each parallel branch.

The arrangement of the request key 20 and the resistive unit 17 may be seen more clearly in FIG. 2 wherein the resistive unit 17 is shown as a strip or cylinder 21 of conductive plastic mounted for movement with the request key 20 and relative to a pair of wipers 22 and 23, one of which engages the stem 24 of the request key 20 and the other of which engages the plastic strip 21.

Referring again to FIG. 1, control unit 19 is responsive to the voltage across resistor **19*r* which, in turn, is responsive to the current through the resistive units 17*a* through 17*j*. The unit 19 turns on at a preset voltage value and turns off when the voltage drops below this value. Any suitable device known in the art, such as a contact making voltmeter, may be employed for unit 19. The values of the resistive units 17*a* through 17*j* and 19*r* are chosen so that when a predetermined number of request keys 20 have been actuated, a voltage equal to the predetermined number of actuated request keys is reached and control unit 19 sends a control signal to operate a lockout mechanism 26 associated with each keyboard 12**.

The lockout mechanism 26 responsive to the control signal is shown in FIG. 2 in relation to the request key 20 and keyboard 12. The mechanism 26 comprises a character key locking device 27 and a request key lockout device 28. Character key locking device 27 comprises a solenoid **27*s* and an interposer 27*j*. Energization of the character key lock solenoid 27*s* prevents operation of the character keys on the keyboard by inserting the interposer 27*j* into the interlock discs 30** which are normally associated with the character keys for preventing operation of two character keys simultaneously. Character key locks are well known in the art and hence a detailed showing and description do not appear to be warranted.

The request key lockout device 28 comprises a solenoid 31, a slider 33 movable by the solenoid 31, and a pair of pivotable levers 34 and 35 positionable by slider 33. Energization of the lockout solenoid 31 in response to signals from the control unit 19 moves slider 33 to the position shown in FIG. 3*a*, where the latching lever 34 is rendered ineffective to latch the distal end 36 of the request key 20. Slider 33 also pivots stop lever 35 to a position which prevents the distal end 36 of the request key 20 from opening switch 38.

The request key lockout device 28, as shown in FIG. 2, is in the rest position, solenoid 31 being deenergized. In this position latching lever 34 is operable to engage the distal end 36 of the request key 20 in a latching relationship when the key 20 is actuated to the request position, as shown in FIG. 3*b*. Actuation of the request key to the latch position opens switch 38 which renders the request key lockout device 28 and the character key locking device 27 ineffective or non-responsive to the signals from control unit 19.

Means in the form of a release key 40 operates a release lever 41 to unlock the request key 20. Upon actuation of the release key 40, its distal end 42 causes a clockwise pivotable movement of release lever 41 which, in turn, pivots latching lever 34 clockwise to a non-locking position which allows the request key 20 to be returned to its normal position under the biasing action of spring 43, as shown in FIG. 3*c*.

Energization of the character key lock solenoid 27*s* and the request key lockout solenoid 31 is controlled by contact 46 which is moved in response to energizaiton of coil 48 by signals from the control unit 19. Closing of contact 46 completes a circuit from voltage terminal 53 to ground through both solenoids.

An indicating circuit 50 is also provided for giving a visual indication of whether or not access to the multiplexing communication system 10 may be obtained by actuation of the request key 20 on a selected keyboard. As shown, indicating circuit 50 comprises a ready lamp 51 and a busy lamp 52 connected to a suitable source of voltage represented by a terminal 53*i* through contacts 56 and 57, respectively, which are operated jointly with contact 46 by coil 48.

The operation of the control system is substantially as follows. Assuming that an operator desires to send a message from keyboard 12*a* and that none of the keyboards are in use, the request key 20*a* on the keyboard 12*a* is actuated from the position shown in FIG. 2 to that shown in FIG. 3*b*. Actuation of the request key 20*a* changes the conductance of the parallel branch containing resistive unit 17*a*, which results in a measurable change in current flowing through resistor 19*r*. Assuming further that unit 19 has been preset to operate in response to current in resistor 19*r* corresponding to the actuation of five request keys 20, request key 20*a* is latched in position represented in FIG. 3*b* since solenoid 31 is deenergized. Switch 38 is open and the request key lockout solenoid 31 and character key lockout solenoid 27*s* are therefore non-responsive to any subsequent signals generated by control unit 19. The operator may thereafter transmit his message to the multiplexing system in the normal manner. At the end of the message the release key 40 is depressed to the position shown in FIG. 3*c*, which causes request key 20 to return to its unactuated position shown in FIG. 2.

If, during the time keyboard 12*a* is in operation, other operators desire access to the system, the above described operations are repeated at each of the keyboards 12*b* through 12*e*. However, after the request key 20*e* on keyboard 12*e* is actuated, assuming that keyboard 12*e* is the fifth keyboard actuated, control unit 19 has reached its preset voltage value, which causes a latching signal to be sent to coils 48 associated with each of the keyboards.

Energizing of coil 48 causes contacts 46 and 57 to close. Closing of contacts 46*a* through 46*e* is ineffective to energize solenoids 27*s* and 31 associated with the keyboards 12*a* through 12*e*. However, closing of contacts 46 associated with remaining keyboards, namely, 12*f* through 12*j*, energizes each of the respective solenoids 27*s*, thereby locking the character keys of each keyboard 12*f* through 12*j*. In addition, closing of contacts 46*f* through 46*j* energizes the respective solenoids 31, moving each of the sliders 33*f* to 33*j* to the lockout position and thereby rendering request keys 20*f* through 20*j* ineffective for guaranteeing access to the communication system 10.

Contacts 57*a* through 57*j* are also operated in response to coils 48*a* through 48*j*, being energized by the control unit 19, which in turn energizes the "busy" lights 52*a* through 52*j*, giving a visual indication to each keyboard that the system is operating to capacity.

When one of the operating keyboards 12*a* through 12*e* is finished with its message transmission and its release key 40 actuated, control unit 19 senses the change, so that transmission of the control signal is stopped. Contacts 46 are opened by a spring return, thereby deenergizing the solenoids 27*s* and 31 of the keyboards 12*f* through 12*j*, which allows another keyboard 12 to obtain access to the communication system upon actuation of its request key.

It will thus be seen that a relatively simple and inexpensive keyboard access control has been provided for a multiplexing communication system in which the number of keyboards exceed the number of available communication channels.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A keyboard access control system for a multichannel communication arrangement comprising in combination a plurality of keyboards each of which is provided with a request key actuable to one position to guarantee access to said communication arrangement, a locking mechanism engageable with said keyboard in response to a control signal for preventing operation of said keyboard and to render said request key ineffective, means for rendering said locking means ineffective in response to actuation of said request key to said one position, and an element for each of said keyboards for varying current from one value to another in response to actuation of said request key to said one position, a control unit, a source of voltage, means connecting said elements in parallel to said voltage source through said control unit, and means responsive to a predetermined condition of said control unit resulting from a predetermined number of said elements having said other current value for generating said control signal.

2. A keyboard access control system for limiting the number of keyboards simultaneously accessible to a multi-channel communication arrangement comprising in combination a plurality of keyboards each of which is provided with a request key actuable from one position to another, means engageable with said request key for locking said request key in said one position, lockout means operable in response to a control signal for rendering said locking means ineffective, keyboard locking means operable in response to said control signal for preventing operation of said keyboard, switch means responsive to actuation of said request key to said one position to render said lockout means and said keyboard locking means ineffective and a resistive unit variable from one value of resistance to another in response to actuation of said request key from said one position to another, and circuit means including said resistive units for generating said control signal in response to variations in the resistance values of a predetermined number of said resistive units corresponding to actuation of a predetermined number of said request keys.

3. The combination recited in claim 2 in which said circuit means comprises a control unit, a source of voltage and means connecting said resistive units in parallel across said voltage source through said control unit.

4. A keyboard access control system for a communication system comprising in combination a plurality of keyboards, each of which is provided with a request key operable in one position to guarantee access to said communication system, a plurality of resistive units each associated with a different said keyboard, means connected to each of said request keys for varying the resistance of its associated one of said units from one value to another in response to actuation of the associated request key to said one position, means for generating a control signal in response to a predetermined number of said resistive units having said other value, locking means engageable with said keyboard in response to said control signal for rendering said keyboard inoperable, and means responsive to actuation of said request keys to said one position to render the associated locking means ineffective.

References Cited in the file of this patent

UNITED STATES PATENTS

| | | |
|---|---|---|
| 1,786,524 | Durbin | Dec. 30, 1930 |
| 2,617,888 | Shepherd | Nov. 11, 1952 |